Patented June 10, 1930

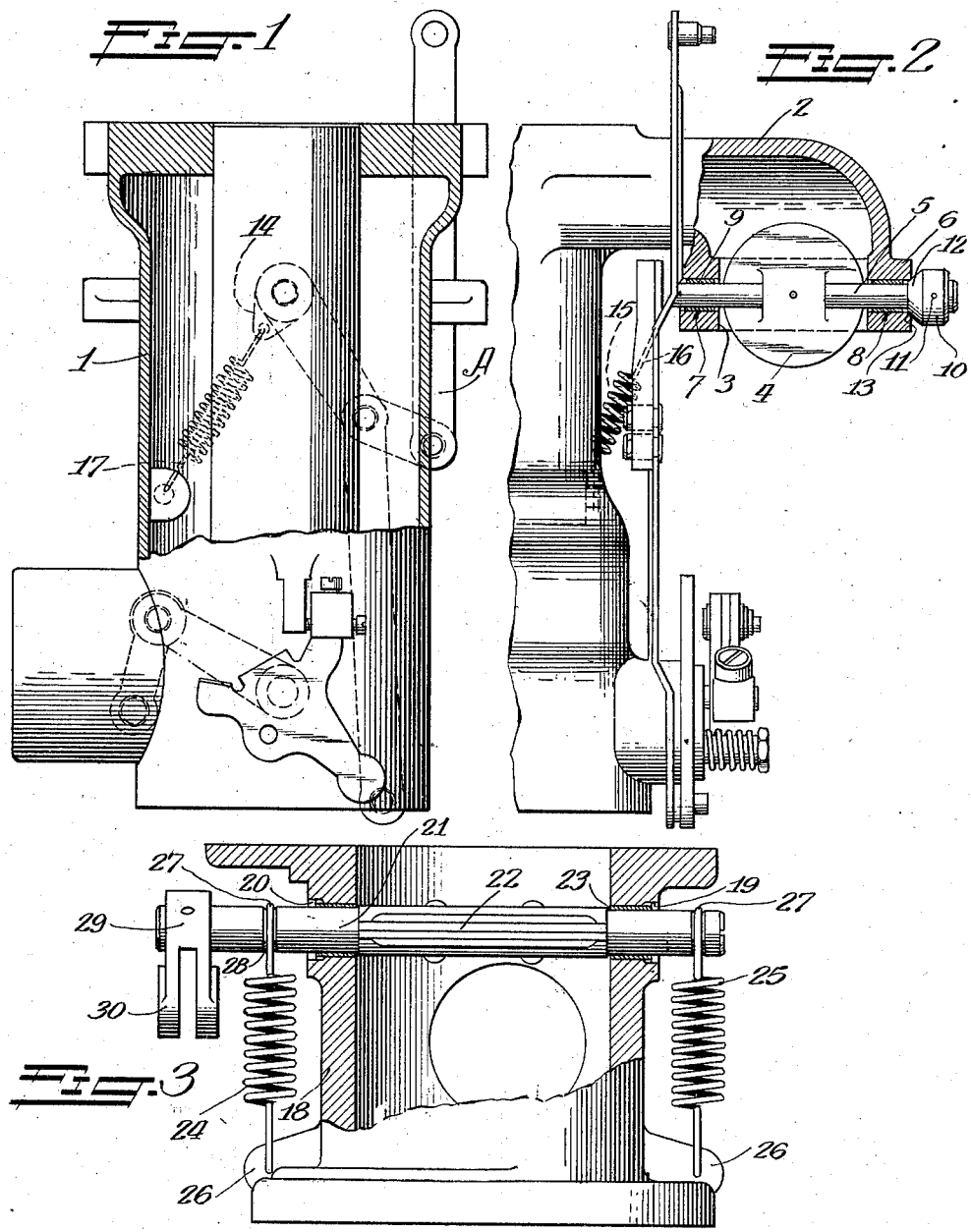

1,763,350

UNITED STATES PATENT OFFICE

JACOB RICHARD FRANCIS, OF FLINT, MICHIGAN

VALVE BEARING

Application filed December 17, 1928. Serial No. 326,553.

This invention relates to valve bearings and has particular reference to the arrangement of bearings for a fly valve or the like for carburetor heaters and such other valves as are used in situations wherein wide variations in temperature occur to prevent chattering of the valve journals in the bearings.

The form of invention chosen to illustrate the same discloses a fly valve arrangement disposed in a branch connection between a carburetor heater and the exhaust manifold of an internal combustion engine. A valve in such position is subject to wide temperature variations, hence must be loosely mounted in its bearings to prevent sticking under high temperature so that it will operate at all times. Such temperatures often reach 1200 to 1500° Fahrenheit and sometimes higher so that the journal holes or apertures must be large enough to allow free and easy turning of the valve journal within the extremes of temperature present even though oxidation of the surfaces takes place and the size of the valve journal varies because of the wide temperature changes. The invention however is not limited to a fly valve or carburetor heater.

An object of the invention is to provide a valve mounting of such nature as will allow operation of the valve through a wide range of temperatures.

Another object of the invention is to provide a valve mounting for preventing chattering of the valve.

A further object of the invention is to provide a valve of the character described which is economical to manufacture, strong and sturdy in construction and efficient in use.

The above, other, and further objects of the invention will be apparent from the following description, the accompanying drawings and the appended claims.

According to the invention a valve is carried on a journal which is supported in its bearings which bearings are larger than the diameter of the journal to allow for wide dimensional changes due to temperature variations with means so disposed with respect to the journal as to hold the journal or valve shaft against that side of the bearing towards which intermittent pressures would force it, such means serving to maintain the valve shaft or journal tightly against its bearings under all conditions of operation.

An embodiment of the invention is illustrated in the accompanying drawings and the views thereof are as follows:

Figure 1 is a side elevational view partially in section of a carburetor heater having a valve associated therewith embodying this invention.

Figure 2 is a fragmental side elevation partially in section of the heater of Figure 1 taken at 90° with respect to Figure 1.

Figure 3 is a side view partially in elevation and partially in section of a modified form of the invention and which illustrates a conduit in which is mounted a valve embodying this invention.

A manifold riser 1 is arranged to be interposed between the carburetor not shown and the intake manifold. The riser 1 is provided with a lateral branch 2 having a circular opening 3 in the end of said branch.

A fly valve 4 is disposed on a journal or valve shaft 5 in the end of the branch 2. The end of the branch 2 is enlarged forming an annular end 6 which end 6 is provided at diametrically opposite points with apertures 7 and 8. The usual anti-friction bearing collars 9 are interposed in the journal apertures 7 and 8. The shaft 5 is supported in the anti-friction bearing members 9 and is arranged with its ends projecting outwardly of the end 6 of the branch 2.

A collar 10 is secured to the outer end of the shaft 5 by a pin 11 or other suitable attaching means. The collar 10 has its inner end formed as a truncated cone for cooperating with the flared end 13 of the aperture 8 for centering the shaft 5 in the aperture at this part of the branch 2. The collar 10 is so arranged on the shaft 5 as to be movable along said shaft for properly raising said shaft in the branch 2, in which event the pin 11 would be inserted through some other hole in the shaft 5.

An outstanding lug 14 is attached to the other end of the shaft outwardly of the bearing aperture 7.

A coil spring 15 has one end 16 hooked into the projection 14 on the shaft 5 and the other end 17 hooked to a lug on the member 1. The spring 15 is a tension spring tending to pull the journal shaft 5 against the underside of the bearings 9 in the journal apertures 7 and 8.

The openings through the anti-friction members 9 are larger than the valve shaft 5 so as to accommodate any expansion of said valve shaft due to the high temperatures and to the wide variation in temperatures occurring in connection with a carburetor heater. The spring 15 will therefore pull the valve shaft 5 always downwardly as shown in Figure 2 so as to prevent any chattering of the valve due to intermittent pressure against said valve when the same is closed or partially closed.

Clearance between the bearing members 9 and the valve shaft 5 is necessary to allow the valve to vibrate in response to intermittent exhaust from the engine which intermittent exhaust creates vibrations which vibrations ordinarily would cause said valve and its shaft to chatter, creating much disturbance and unpleasantness in the operation of the vehicle to which this heater might be attached.

Arranging this spring in the manner heretofore described allows the use of a lighter tension spring than otherwise would be necessary were it arranged on the other side of the journal as such springs would then have to be tensioned to resist the periodic effort of the exhaust to move the valve and a greater friction would result.

The form of the invention illustrated in Figure 3 comprises a conduit 18 having diametrically disposed openings 19 and 20 in the same for the reception of a shaft 21 carrying a fly valve 22. The diameters of the openings 19 and 20 are considerably greater than the diameter of the shaft 21. The usual anti-friction bearing members 23 are interposed between the shaft 21 and the openings 19 and 20. The relationship between the diameter of the shaft 21 and the bearing members 23 is such as to allow for dimensional changes due to wide temperature variations.

The shaft 21 is held against the lower side of the bearing members 23 by two springs 24 and 25 arranged near the ends of the shaft 21 and outwardly of and spaced from the conduit 18. Each of the springs is hooked through extensions 26 on opposite sides of the conduit 18 while the other ends of the springs are looped at 27 which loops engage recesses 28 in the shaft 21. The springs 24 and 25 are tension springs tending to pull the shaft 21 downwardly as shown in Figure 3 so as to eliminate chattering of the valve shaft 21 and its supported valve 22 irrespective of the temperature variations present in the conduit 18.

The springs 15, 24, and 25 are spaced from the walls of the heater 1 in the first instance and the conduit 18 in the second instance to prevent transfer of heat to the springs of sufficient amount to raise the temperatures of the springs to a degree destructive to the characteristics of the springs as springs. Insulating material might if desired be interposed between the springs and the conduit walls to further protect the springs against the effect of the heat passing through the conduit.

The valve shaft 5 of Figures 1 and 2 is oscillated by a system of levers A connected to any suitable control element under the control of the operator of the vehicle to which this heater may be attached.

The shaft 21 in the form of the invention illustrated in Figure 3 is provided at one end with an arm 29 suitably attached to the shaft which arm has spaced ears 30 for the reception of any suitable control mechanism.

The invention has been described herein more or less precisely, yet it is to be understood that changes may be made in the arrangement and proportion of parts and that equivalents may be substituted without departing from the spirit and scope of the invention.

The invention is claimed as follows:

1. A valved conduit, a valve in said conduit, a valve shaft carrying said valve, said conduit having openings for said valve shaft of greater diameter than said shaft, means for rotating said shaft, and means engaging said shaft to hold the same against one side of the valve shaft openings.

2. A valved conduit, a fly valve in said conduit, a valve shaft extending through said conduit, said conduit having openings for said shaft of greater diameter than said shaft, means for rotating said shaft, and resilient means engaging said shaft to retain the same against one side of the valve shaft openings.

3. A valved conduit, a fly valve in said conduit, a valve shaft, said conduit having openings for supporting said shaft, said openings being of greater diameter than said shaft, means for rotating said shaft, and means engaging said shaft outwardly of said conduit for pressing said shaft against one side of said shaft openings.

4. A valved conduit, a fly valve in said conduit, a valve shaft, said conduit having openings for supporting said shaft, said openings being of greater diameter than said shaft, means for rotating said shaft, means for centering one end of said shaft in its opening, and means engaging the other end of said shaft for pressing said shaft against one side of its shaft openings.

In testimony whereof I hereunto subscribed my name.

JACOB RICHARD FRANCIS.